United States Patent [19]

Kubota et al.

[11] Patent Number: 4,513,276

[45] Date of Patent: Apr. 23, 1985

[54] SAFETY SYSTEM OF AUTOMOTIVE AUTOMATIC TRANSMISSION OPERATING DEVICE

[75] Inventors: Shikibu Kubota; Shisaku Tsuji, both of Tokyo, Japan

[73] Assignee: Nissan Motor Company, Limited, Yokohama City, Japan

[21] Appl. No.: 344,823

[22] Filed: Feb. 1, 1982

[30] Foreign Application Priority Data

Feb. 9, 1981 [JP] Japan .................................. 56-17627

[51] Int. Cl.[3] ......................... B60Q 1/00; F02N 17/00

[52] U.S. Cl. ................................ 340/52 R; 340/52 D; 340/686; 74/6; 74/473 R; 74/475; 74/850; 116/28.1; 116/DIG. 20; 123/179 R; 123/179 K; 180/70 R; 200/61.88; 200/61.91; 290/DIG. 6

[58] Field of Search .................... 340/52 R, 52 D, 64, 340/686, 687; 74/850, 6, 473 R, 475, 477; 200/61.88, 61.9, 61.91; 123/179 K, 179 G, 179 R; 310/80; 318/384, 430; 116/DIG. 20, 28.1; 180/70 R; 307/9, 10 R, 10 AT; 290/37 R, DIG. 3, DIG. 6

[56] References Cited

U.S. PATENT DOCUMENTS

| | | | |
|---|---|---|---|
| 3,613,482 | 10/1971 | Benson, Jr. et al. | 123/179 K |
| 3,795,779 | 3/1974 | Grieves et al. | 200/61.88 |
| 4,051,915 | 10/1977 | Behrens | 307/10 R |
| 4,363,249 | 12/1982 | Stugart | 340/52 R |

FOREIGN PATENT DOCUMENTS

| | | |
|---|---|---|
| 953178 | 3/1964 | United Kingdom . |
| 1383752 | 2/1975 | United Kingdom . |
| 2017838 | 10/1979 | United Kingdom . |

*Primary Examiner*—Donnie L. Crosland

*Attorney, Agent, or Firm*—Schwartz, Jeffery, Schwaab, Mack, Blumenthal & Koch

[57] ABSTRACT

A safety system for a motor vehicle having an automatic transmission, a shift lever movable into select positions for allowing the transmission to assume the corresponding gear conditions thereof, stepped operation surfaces, and a stop pin movable with the shift lever and slidably engageable with the stepped operation surfaces for retaining the shift lever at one of the select positions. A position detector switch is provided which connects the starter motor of the vehicle with an electric power source. The position detector switch includes at least one stationary contact member mounted to one of the stepped operation surfaces, and a single movable contact member mounted to the stop pin at the portion engageable with the stepped operation surfaces.

7 Claims, 5 Drawing Figures

SAFETY SYSTEM OF AUTOMOTIVE AUTOMATIC TRANSMISSION OPERATING DEVICE

FIELD OF THE INVENTION

The present invention relates in general to an operating device of an automotive automatic transmission, and more particularly to a safety system of the operating device which assures non-operability of a starter motor of the vehicle so long as the manually operated shift lever is in a vehicle moving position, that is, a Drive (D), Second Drive ($D_2$), First Drive ($D_1$) or Reverse (R) position.

SUMMARY OF THE INVENTION

It is an object of the present invention to provide a safety system, in an operating device of an automotive automatic transmission having a shift lever movable into select positions for allowing the transmission to assume the corresponding gear conditions thereof, means defining stopped operation surfaces, and a stop pin movable with the shift lever and slidably engageable with the stepped operation surfaces for retaining the shift lever at one of the select positions. The safety system comprises a position detector switch which connects the starter motor of the vehicle with an electric power source when assuming its close position, said position detector switch including at least one stationary contact member mounted to one of the stepped operation surfaces, and a movable contact member mounted to the stop pin at the portion engageable with the stepped operation surfaces.

DESCRIPTION OF THE PRIOR ART

Figure 1:
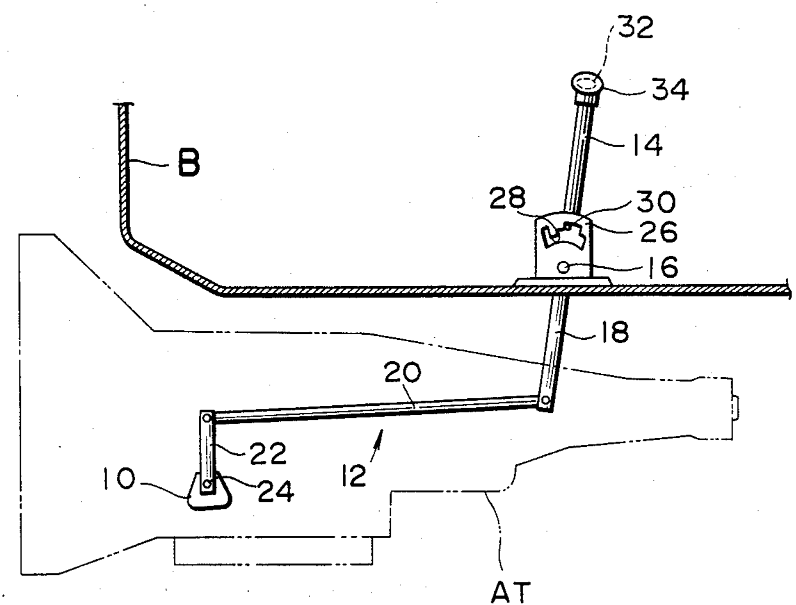
FIG. 1 is a schematic view of an automotive automatic transmission equipped with a conventional operating device.

Prior to describing in detail the present invention, a conventional operating device of the automotive automatic transmission will be outlined with reference to FIG. 1 for clarification of the invention.

In order to prevent the vehicle from unexpected sudden movement as the starter motor is operated, the operating device of the automatic transmission has an inhibitor switch. the inhibitor switch inhibits operation of the starter motor when the transmission is in a vehicle moving position, that is, a Drive position (D), Second position ($D_2$), First position ($D_1$) or Reverse position (R), while allowing operation of the starter motor only when the transmission is in a vehicle stopping position, that is, a Parking position (P) or Neutral position (N).

As is seen from FIG. 1, the inhibitor switch 10 of the operating device is mounted to the casing of the transmission AT and connected to a leading end of a control linkage 12 which transmits movement of a shift lever 14 mounted in the vehicle cabin to a known part of the transmission AT. In particular, when the shift lever 14 is moved about a shaft 16 in a certain direction, the movement is transmitted through the pivoted levers 18, 20 and 22 of the control linkage 12 to a known manual shaft 24 to rotate the same. The rotation of the manual shaft 24 is transmitted to the inhibitor switch 10 as well as to a known manual valve (not shown) installed in the transmission AT to cause the transmission to establish one of the gear conditions. The inhibitor switch 10 is so designed that when the manual shaft 24 is rotated by a given angle to cause the transmission AT to assume the parking condition (P) or the neutral condition (N), it operates to close an electric circuit enabling the starter motor (not shown) to operate, while, when the manual shaft 24 is rotated by a given angle to cause the transmission AT to assume one of the vehicle moving conditions, that is, D, $D_2$, $D_1$ or R condition, the switch 10 opens the electric circuit thereby to inhibit the operation of the starter motor. Designated by numeral 26 is a position plate which is fixed to the vehicle body B. The position plate 26 is formed with an opening having at its upper side a stepped engaging surface 28 with which a stop pin 30 is engageable. The stop pin 30 is linked to a push button 32 mounted in a knob 34 of the shift lever 14. With a suitable biasing means, the stop pin 30 is biased to contact with the stepped engaging surface 28 of the opening, so that a shifting operation of the shift lever 14 to a certain select position, that is, R or P position, is permitted only when the push button 32 is pushed for releasing the stop pin 30 from the stepped engaging surface 28. In this manner, when the vehicle is cruising the automatic transmission AT is prevented from inadvertently moving into the reverse condition (P) or the parking condition (P).

However, in the operating devices of the type mentioned above, it is impossible, from the manufactured point of view, to completely or precisely match each select position of the shift lever 14 with the corresponding operation position of the inhibitor switch 10. Thus, there is a possibility of permitting the inhibitor switch 10 to be in its close position when the shift lever 14 is in an unstable intermediate position, for example, the position between the parking position (P) and the neighbouring reverse position (R). When, under this condition, the driver starts the starter motor to run the engine, and then the shift lever 14 is accidently moved from the unstable intermediate position to the proper reverse position (P) by some reasons such as a vehicle vibration, there occurs a serious problem in that the vehicle inadvertently starts to move backwards.

Therefore, it is an essential object of the present invention to provide a safety system of the operating device which solves the above-mentioned drawback.

DESCRIPTION OF THE INVENTION

Figure 2:
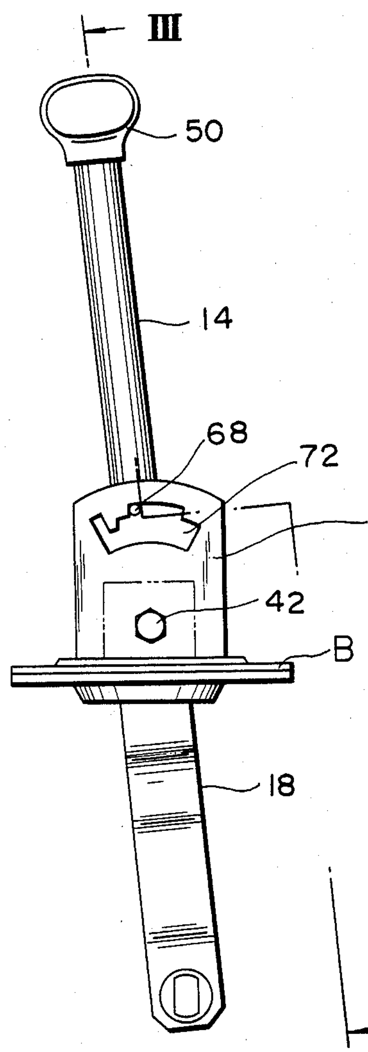
FIG. 2 is a front view of a shift lever assembly with which the safety system of the present invention cooperates.
Figure 3:
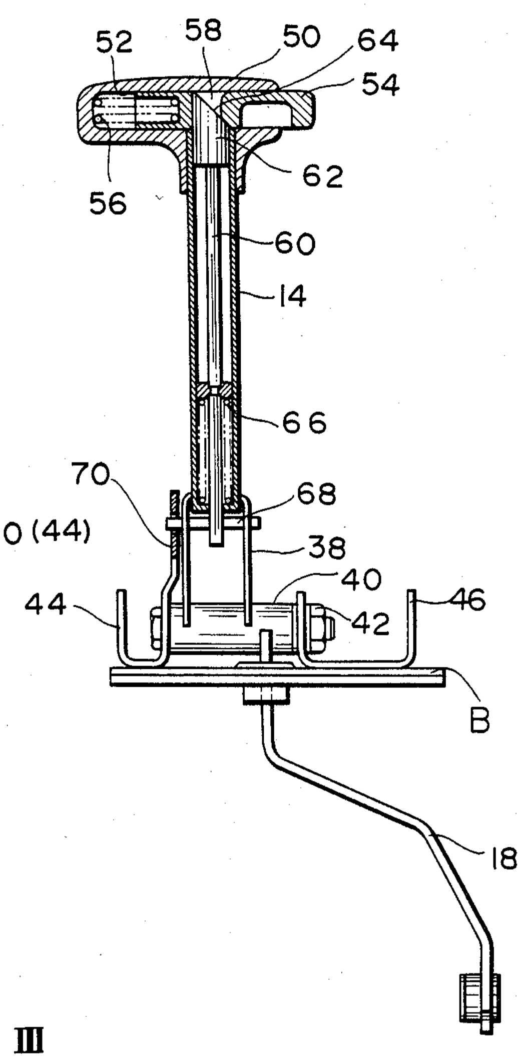
FIG. 3 is a sectional view taken along the line III—III of FIG. 2.
Figure 4:
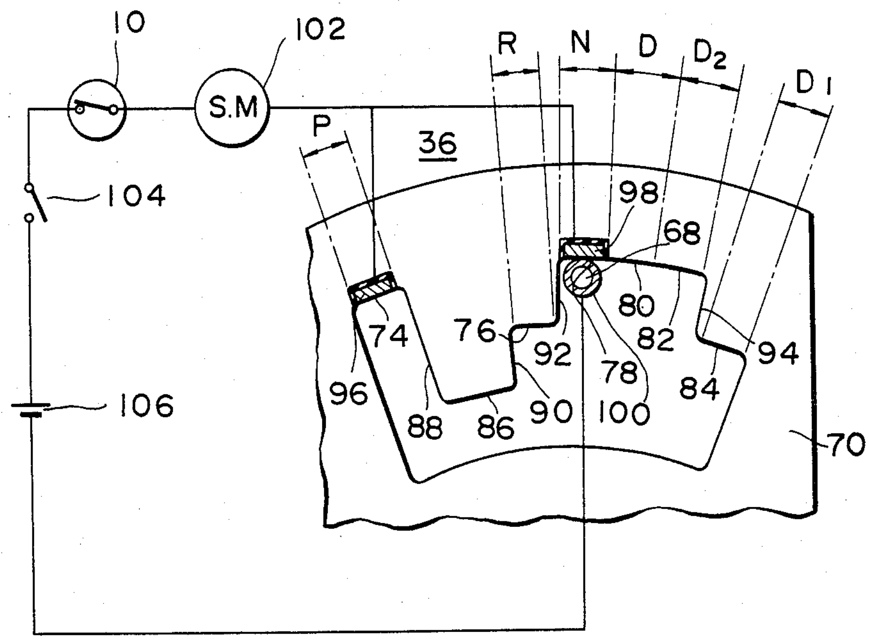
FIG. 4 is an illustration showing the arrangement of the safety system of the present invention.

Referring to FIGS. 2 to 4, particularly FIG. 4, there is shown a safety system of the operating device according to the present invention.

The safety system of the operating device comprises generally a conventional inhibitor switch 10 and a position detector switch 36 which is arranged in the shift lever assembly as is seen in FIG. 4.

The shift lever assembly used in the invention is shown in detail in FIGS. 2 and 3, which comprises a tubular shift lever 14 connected through a bracket 38 to a rotatable shaft 40. The rotatable shaft 40 is rotatably supported through a bolt-nut assembly 42 by a pair of supporters 44 and 46 secured to the vehicle body B. Extending from the rotatable shaft 40 and rotatable therewith is a lever 18 of the control linkage 12 which leads to the inhibitor switch 10. Thus, it will be appreciated that the pivotting movement of the shift lever 14 about the axis of the rotatable shaft 40 induces a simultaneous pivotting movement of the extension lever 18 about the same axis. The shift lever 14 is provided at its top end with a knob 50 which has a horizontally extending blind hole 52 formed therein. Slidably received in the blind hole 52 is a push button 54 which is biased in a direction to project outwardly by a spring 56 disposed in the depth of the blind hole 52. The push button 54 is formed with a hole 58 which extends normal to the axis of the blind hole 52. Axially movably received in the tubular shift lever 14 is a push rod 60 which is provided with an enlarged head portion 62 having an inclined surface 64. The head portion 62 of the push rod 60 is partially received in the hole 58 of the push button 54 with the inclined surface 64 thereof contacting a wall portion of the hole 58. A compression spring 66 is disposed in the depth of the tubular shift lever 14 to bias the push rod 60 upwardly, that is, in a direction to force the head portion 62 to enter the hole 58 of the push button 54. The lower end portion of the push rod 60 projects partially from the lower end of the shift lever 14 and has a horizontally extending stop pin 68 secured thereto. As is seen from FIGS. 2 and 3, one of the supporters 44 and 46, that is the supporter 44, is integrally provided with a position plate 70 which has an opening 72 into which an end of the pin 68 enters. Due to action of the spring 66, its usual state, the stop pin 68 is biased to contact with the upper marginal surface of the opening 72 which constitutes a stepped engaging surface. However, as is understood from the drawing, when the push button 54 is pushed, the push rod 60 is moved downwardly against the force of the spring 66 thereby releasing or separating the stop pin 68 from the stepped engaging surface of the opening 72. As is seen from FIG. 4 the stepped engaging surface comprises curved operation surfaces 74, 76, 78, 80, 82 and 84 which are concentric with the shaft 40 and located at positions corresponding to the respective select positions P, R, N, D, $D_2$ and $D_1$ of the shift lever 14, a raised surface 86 located between the operation surfaces 74 and 76 and radially extending surfaces 88, 90, 92 and 94 which connect the neighbouring operation surfaces and the raised surface 86 in a manner as shown in the drawing. As is shown in FIG. 4, the operation surfaces 78, 80 and 82 corresponding to the N, D and $D_2$ select positions of the shift lever 14 are connected with each other without forming obstructions or gaps therebetween, so that the shifting operation of the shift lever 14 within the range from the N position to the $D_2$ position is achieved without handling the push button 54. However, the operation surfaces 76, 84 and 74 corresponding to the R, $D_1$ and P select positions of the shift lever 14 are spaced from each other to form therebetween obstructions or gaps, as shown, so that the shifting operation of the shift lever 14 to any one of these three positions is made by handling the push button 54 for passing the stop pin 68 over the neighbouring obstructive surface.

The position detector switch 36, which constitutes an essential element of the present invention, is arranged on the shift lever assembly. As is seen from FIG. 4, the position detector switch 36 comprises two stationary contact points 96 and 98 mounted to the position plate 70, and a movable contact point 100 mounted to the pin 68. The stationary contact points 96 and 98 are respectively mounted to the operation surfaces 74 and 78 of the position plate 70 which correspond to the P position and the N position of the shift lever 14, respectively. For electrical insulation, mounting each stationary contact point 96 or 98 to the associated operation surface 74 or 78 is made with a suitable insulator (no numeral) interposed therebetween. The movable contact point 100 is mounted to the pin 68 at a portion engageable with the stepped engaging surface of the opening 72. A suitable insulating member (not shown) is interposed between the point 100 and the pin 68 for achieving electric insulation therebetween. With this, it will be appreciated that the position detector switch 36 assumes its close position only when the stop pin 68 is located at either the operation surface 74 or the operation surface 78, that is, when the shift lever 14 assumes either the P position or the N position. As is clearly shown by FIG. 4, the stationary contact points 96 and 98 are both connected to the starter motor 102 which is, in turn, connected to the inhibitor switch 10. As is described hereinafore, the inhibitor switch 10 is so designed that when the manual shaft 24 (see FIG. 1) is rotated by a given angle to cause the automatic transmission to assume the P condition or N condition, it takes its close position. The inhibitor switch 10 is connected through the ignition key switch 104 to a battery 106 which is, in turn, connected to the movable contact point 100 on the stop pin 68. Thus, it will be appreciated that the position detector switch comprising the stationary contact points 96 and 98 and the movable contact point 100 is connected in series to the inhibitor switch 10. Thus, the energization of the starter motor 102 in response to turning-on of the ignition key switch 104 is achieved only when both the inhibitor switch 10 and the position detector switch 36 are in their close positions.

In the following, operation of the safety system will be described.

When, now, the shift lever 14 takes either the proper P position or the proper N position, not only the inhibitor switch 10 but also the position detector switch 36 assumes its close position. Thus, under this condition, the starter motor 102 starts to run upon turning the ignition key switch 104 on.

While, when the shift lever 14 takes a position other than the P and N positions, at least the position detector switch 36 is in its open position. Thus, under this condition, the starter motor 102 is inhibitted from running irrespective of the state of the inhibitor switch 10 even when the ignition key switch 104 is turned on. Accordingly, even when the shift lever 14 is in the above-mentioned unstable position which would produce the closed state of the inhibitor switch 10, the unexpected sudden moving of the vehicle does not occur.

To those skilled in the art, it will be appreciated that the above-mentioned safe function is also expected even when the inhibitor switch 10 is omitted. In this arrangement, the starter motor 102 is directly connected to the ignition key switch 104.

Figure 5:
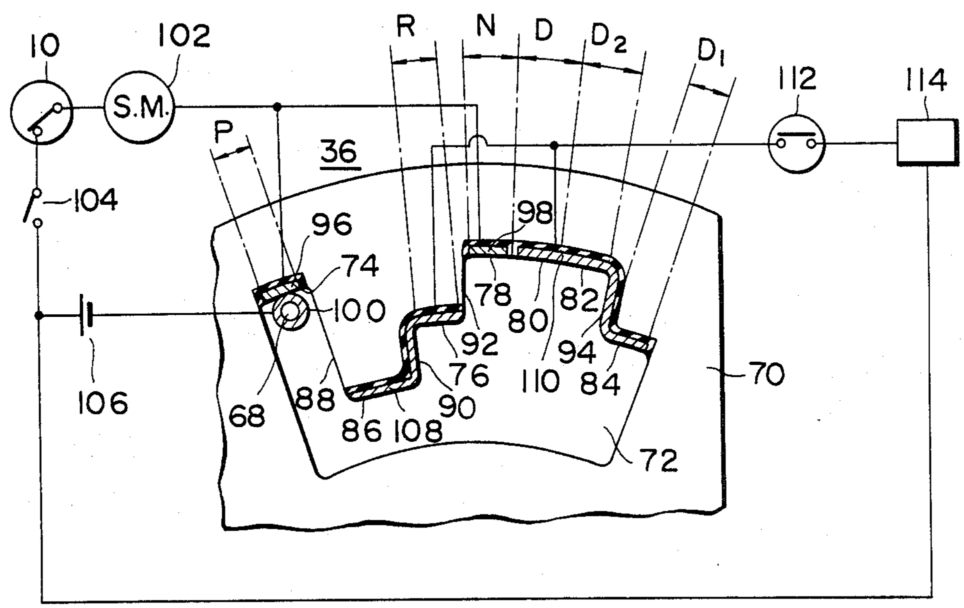
FIG. 5 is a view similar to FIG. 4, but showing a modification of the safety system.

Referring to FIG. 5, there is shown a modification of the safety system of the present invention. The modification is constructed to provide the above-mentioned safety system with an alarm system. As will become clear from the following, the alarm system gives an alarm when a vehicle door is kept open when shifting the shift lever 14 to one of the vehicle moving positions which are the D, $D_2$, $D_1$ and R positions.

For ease with which the following description is made, the same portions or parts as those in the aforementioned safety device are designated by the same numeral and detailed explanation of which is omitted from the following.

The alarm system of this modification comprises two crank-shaped stationary contact members 108 and 110 mounted to the position plate 70, and uses the movable contact point 100 on the stop pin 68 as an essential element. As is shown, the stationary contact member 108 covers the entire of the surfaces 86, 90 and 76 with an interposal of a suitable insulator (no numeral) therebetween, while, the other stationary contact member 110 covers the entire of the surfaces 80, 82, 94 and 84 with an interposal of an insulator (no numeral) therebetween. The stationary contact members 108 and 110 and the movable contact point 100 thus constitute another position detector switch which closes when the shift lever 14 takes one of the vehicle moving positions, that is, R, D, $D_2$ or $D_1$ select position. The stationary contact members 108 and 110 are both connected to a door switch 112 which takes its close position when a vehicle door is open. The door switch 112 is connected to an electric alarm device 114 which is, in turn, connected to the movable contact point 100 through the battery 106. Thus, it will be appreciated that when the movable contact point 100 contacts with either the stationary contact member 108 or the other contact member 110 and the door switch 112 takes its close position, the electric alarm device 114 is energized. Accordingly, when the vehicle door is open under a vehicle moving condition (R, D, $D_2$ or $D_1$) of the automatic transmission AT, the alarm device 114 gives the passengers a warning.

What is claimed is:

1. In a motor vehicle having a starter motor, an electric power source, an automatic transmission, a shift lever movable into select positions for placing the transmission in corresponding gear conditions, means defining stepped operation surfaces, and a stop pin carried on said shift lever to move therewith and slidably engageable with said stepped operation surfaces for retaining said shift lever at ones of said select positions, a safety system comprising:

(a) a starter switch interposed between said starter motor and said electric power source, and (b) a position detector switch connected in series with said starter switch for energizing said starter motor upon closure of said starter switch and said position detector switch, said position detector switch including at least one stationary contact member mounted to at least a part of one of said stepped operation surfaces, and a single movable contact member mounted to said stop pin at the portion engageable with said stepped operation surfaces whereby engagement of said stop pin with said at least one stationary contact member of said one stepped operation surface both retains said shift lever and closes an electrical circuit for energizing said starter motor.

2. A safety system as claimed in claim 1, further comprising an inhibitor switch which is connected in series to said position detector switch, said inhibitor switch assuming its close position only when said transmission assumes at least one predetermined vehicle stopping gear condition which induces a halt of the vehicle.

3. A safety system as claimed in claim 2, in which the stepped surface to which said stationary contact member is mounted is the surface which is engaged with said stop pin when said shift lever is moved to a position causing the transmission to assume said predetermined vehicle stopping gear condition.

4. A safety system as claimed in claim 3, in which said predetermined vehicle stopping gear condition of the transmission is Parking condition or Neutral condition.

5. A safety system as claimed in claim 4, in which said stationary and movable contact members are mounted to their associated mounting members through electrical insulators.

6. A safety system as claimed in claim 5, in which said inhibitor switch is connected in series to an ignition key switch (104).

7. A safety system as claimed in claim 1, further comprising an alarm system which includes:

another position detector switch including said single movable contact member, and at least one additional stationary contact member mounted to one additional stepped operation surface other than the operation surface to which said one stationary contact member is mounted;

a door switch operable to close when a door of the vehicle opens; and an alarm device functioning to produce an alarm when electrically energized, wherein said another position detector switch, said door switch and said alarm device are connected in series through the electric power source.

* * * * *